United States Patent [19]

McCabe

[11] Patent Number: 4,537,388
[45] Date of Patent: Aug. 27, 1985

[54] ADJUSTABLE TENSIONING DEVICE

[76] Inventor: Francis B. McCabe, 38 Cedar St., Everett, Mass. 02149

[21] Appl. No.: 378,215

[22] Filed: May 14, 1982

[51] Int. Cl.³ .............................................. F16B 7/06
[52] U.S. Cl. ..................................... 254/232; 403/43; 403/46
[58] Field of Search ............... 254/231, 232, 235, 236, 254/234; 403/43–48, 229; 52/147, 148

[56] References Cited

U.S. PATENT DOCUMENTS

| | | | |
|---|---|---|---|
| 2,615,678 | 10/1952 | Stent | 254/231 |
| 3,278,210 | 10/1966 | Sanders | 254/232 X |
| 3,743,330 | 7/1973 | Itatani | 403/44 |
| 3,806,265 | 4/1974 | Hattan | 403/46 |
| 4,082,469 | 4/1978 | Symborski | 403/47 X |

Primary Examiner—Stuart S. Levy
Assistant Examiner—David Werner
Attorney, Agent, or Firm—Wolf, Greenfield & Sacks

[57] ABSTRACT

An adjustable tensioning device for stays, rigging, guides and the like, includes an anti-separation member intermediate two adjusting members which are threadably engaged with two threaded members which are themselves threadably engaged with the anti-separation member on opposite sides thereof. A moveable member is associated with each adjusting member and moves correspondingly because of its location between the adjusting member and a restricting member. Each moveable member is connected to an associated attachment receiving element by a number of connecting members moveably engaged with the anti-separation member such that the anti-separation member is intermediate the adjusting member and the attachment receiving element. The anti-separation member may incorporate a yieldable compensator such as a spring or hydraulic cylinder in which case the anti-separation member. In either event a locking device may be included to hold a desired tension adjustment.

20 Claims, 10 Drawing Figures

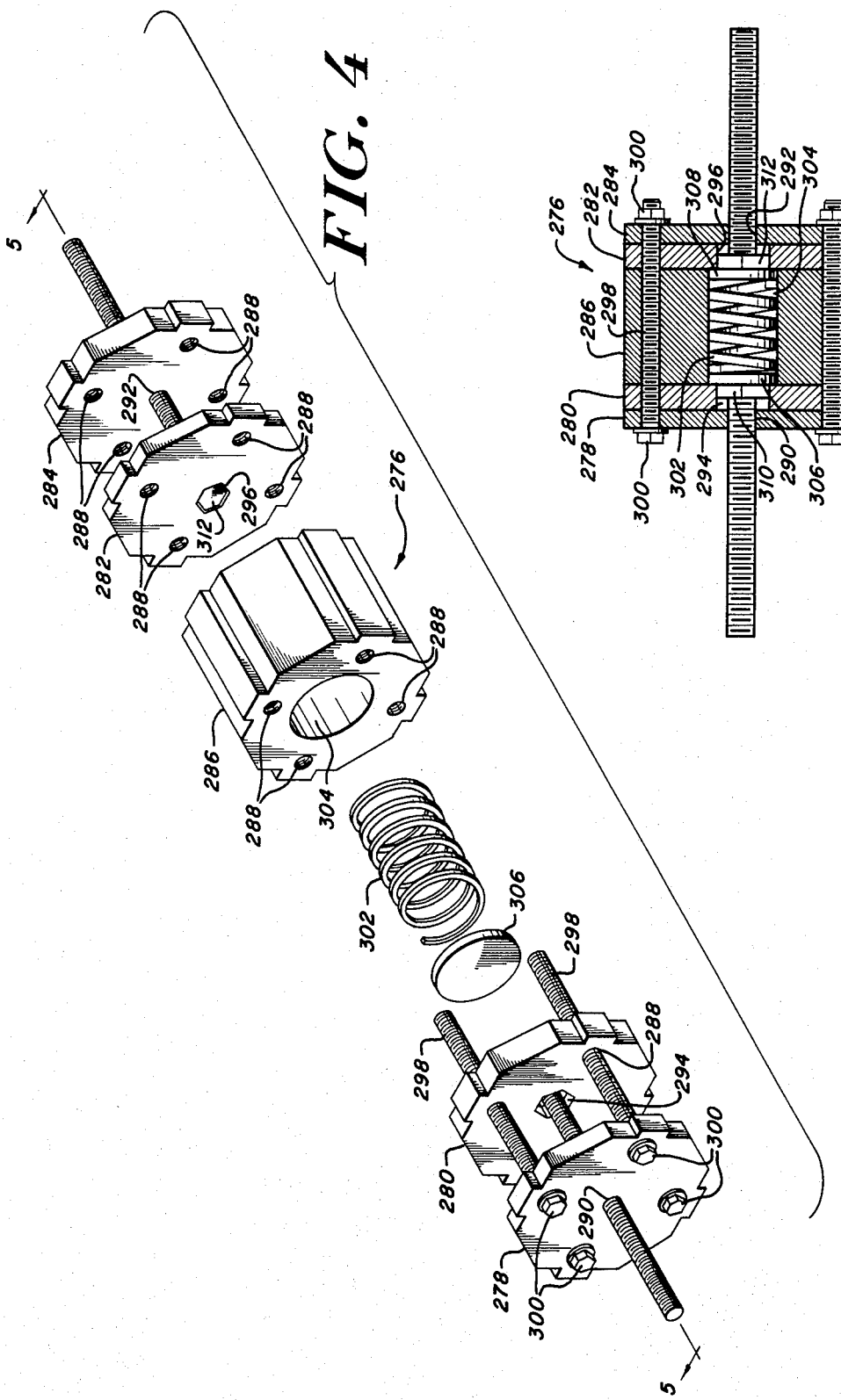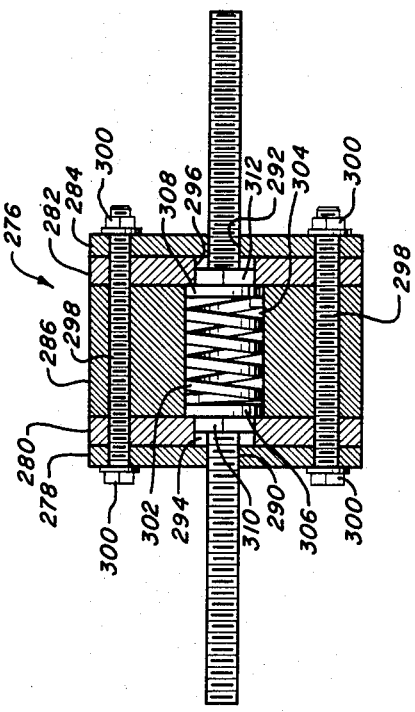

ADJUSTABLE TENSIONING DEVICE

BACKGROUND OF THE INVENTION

The present invention pertains to turnbuckles and similar devices for tensioning stays, rigging, guides and the like. The present invention is particularly suited for use with sailing vessels.

Turnbuckles comprise the majority of devices presently used to control the tension to the stays used to position the masts of sailing vessels. The turnbuckle consists of a rigid member or housing with either screw threads at both ends or screw threads at one end and a swivel at the other end. The stay is attached to threaded bolts threadably engaged with the groove threads on the rigid member. A conventional mast for instance is held in position with four mutually orthogonal stays. Each stay is attached at one free end to the mast and at the opposite free end to the sailing vessel. A turnbuckle, generally with screw threads at both ends, is attached to each stay between the free ends. Thus, a total of four stays and four turnbuckles are used in most instances to position the mast. A standard turnbuckle has right handed threads at one end and left handed threads with the same pitch at the other end. The turnbuckle threads therefore may be either coarse or fine but not both. Therefore, rotation of the rigid member causes the threaded bolts to move in or out depending upon the direction of rotation. One complete rotation of the rigid member equals a shortening or lengthening of the turnbuckle equal to the movement caused by two complete rotations of either threaded bolt. If either a turnbuckle or a stay fails the loss of tension allows the mast to fall. When an overstressed turnbuckle fails, the threads are stripped or the housing breaks or possibly both. But in any event, a failed turnbuckle is of no further use and must be replaced entirely.

The weakest element of the turnbuckle is the threaded surface of the threaded bolts at either end. The weak spot of the turnbuckle is where the engaged threads of the bolts and the rigid member meet. Any excessive strain or stress is applied to the contact surface with the area of minimum diameter. Over tensioning stretches the metal which will eventually fail. However, before turnbuckle failure, metal stretch results in loosening of the stays and sagging or leaning of the mast since the separate turnbuckles do not deform uniformly. Subsequent readjustment of the turnbuckle may conceal the damaged portion within the threaded end of the rigid member. However, the damaged threads are still under constant tension even though concealed and thus are subject to further damage.

The threads of each turnbuckle assembly, the rigid member and threaded bolts, are also subjected to constant vibration transmitted through the stays. Occasionally harmonic vibrations are established which may be quite damaging to the threads. The damage to the threads due to vibration is usually concealed within the threaded portion of the rigid member since it is the threads in contact with one another that will be damaged by the vibration.

It is common practice to overcome the faults of the standard turnbuckle by over engineering the turnbuckle. This overengineering acts to transfer the location of failure from the turnbuckle to the stay or its associated hardware resulting in a more serious or dangerous uncontrolled failure.

What is needed is a device that provides the function of a turnbuckle without the separation and accompanying losses upon its failure. In other words a device that contains any failure that may occur.

SUMMARY OF THE INVENTION

A principle object of the present invention is to eliminate the problems that result from turnbuckle separation upon its failure by providing a device that does not separate upon failure. To accomplish this object the means for adjusting tension are spaced apart from the tension application point by a device secured there between. Thus, a failure of either adjustment means results in a small separation equal to the distance between the failed adjustment means and the device but does not result in separation of the device itself.

Another object of the present invention is to provide a single device incorporating both course adjustment means and fine adjustment means available on the turnbuckle.

Still another object of the present invention is to provide locking means to prevent unwanted rotation of the adjustment means.

Still another object of the present invention is to provide a yieldable compensator to absorb excessive tension on the device over and above the maximum tension for which the device may be designed. To accomplish this object the device secured between the asjustment means includes a yieldable means such as a spring or hydraulic cylinder in association with the adjustment means.

Another object of the present invention is to provide an adjustable tensioning device which has a known allowable maximum tension and which may be applied such that failure of the system which is in tension occurs in the device and not the surrounding stays or associated hardware.

Yet another object of the present invention is to provide means for dissipating vibration transmitted to the device such that threadwear is reduced resulting in longer life for the device.

Another object of the present invention is to provide an adjustable tensioning device allowing accurate tension adjustment by providing a coarsely threaded adjustment means as well as a finely threaded adjustment means.

Still another object of the present invention is to provide an adjustable tensioning device which is easy to use and consists of a number of standard pieces allowing for simple repair after failure and practically unlimited reuseability.

Yet another object of the present invention is to provide an adjustable tensioning device which is inexpensive to manufacture and a device that consists of a few standard parts.

Another object of the present invention is to provide an adjustable tensioning device capable of being made in any number of sizes and out of a wide range of materials such as metals, plastics, or part metal and part plastic dependent only upon the intended application.

These and other objects of the present invention are provided by an adjustable tensioning device which consists of a member for precluding separation of the device upon its failure. The anti separation member may include a plurality of guides parallel to the longitudinal axis of the device and located about its outer surface. Two members are attached to opposite ends of the anti separation member. The members may be threaded and may have different pitch threads. An adjusting member is engaged with each member and associated with a plurality of side bars slidably engaged with the guides as well as a plurality of elements connecting groups of side bars into assemblies such that each assembly moves as a unit. Means are provided for attaching a stay or the like to an assembly or assemblies adjacent the anti separation member but opposite from the associated adjusting member. Thus, upon failure, for instance failure of the threads, the intermediate anti-separation member precludes separation of the tensioning device. The anti separation member may incorporate a yieldable compensator to absorb any excess tension acting on the device. The device may also include a locking assembly which holds the adjusting members of a desired position.

BRIEF DESCRIPTION OF THE DRAWINGS

Further features and characteristics of the present invention can be seen from the figures and descriptions below in which:

FIG. 4 is an exploded view of an alternative embodiment of the central portion of the tensioning device shown in FIGS. 1 through 3;

FIG. 5 is a cross sectional elevation taken along line 5—5 of the assembled alternative embodiment illustrated in FIG. 4;

DETAILED DESCRIPTION OF THE INVENTION

Figure 1:
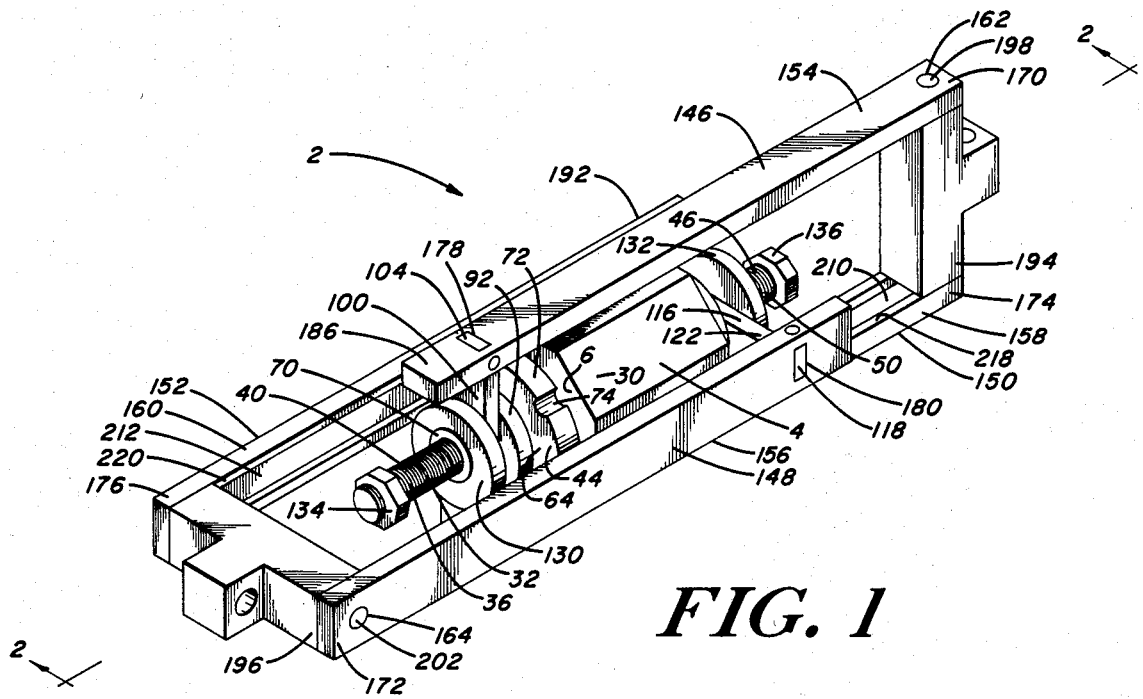
FIG. 1 is a perspective view of the tensioning device of the present invention.

The present invention consists of a device 2 for tensioning a stay, guide, cable, rigging and the like. An embodiment of the device is shown in FIG. 1 The tensioning device of the present invention may be used in practically any situation where turnbuckles are presently utilized. A preferred embodiment and the one described in detail may be used for example, in lieu of the turnbuckles presently used in association with the mast supporting stays on a sailing vessel.

Figure 8:
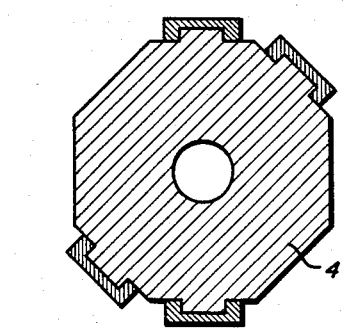
FIG. 8 is another embodiment of the present invention.

The central element to the present invention is an anti separation member or guide bar 4. In the embodiment illustrated the guide bar 4 has an octognoal cross section with first and second parallel faces 6 and 8. The faces are perpendicular to the sides. The guide has a coarsely threaded bore 10 along its longitudinal axis opening in the first parallel face 6 and a finely threaded bore 12 located along its longitudinal axis and opening in the second parallel face 8. Four rectangular shoulders 14, 16, 18 and 20 parallel to the longitudinal axis of the guide protrude from four of the faces 22, 24, 26 and 28 of the outer surface 30 of the guide 4. As illustrated in FIGS. 1-4, each shoulder may be located 90 degrees from the adjacent shoulders. In a preferred embodiment the guide is made of stainless steel. However, the guide as well as the other elements of the device may be manufactured from a wide range of materials, including various metals or plastics. For instance, standard turnbuckles which the present invention may replace are presently made of such varied materials as stainless steel, containing chromium, nickel, iron, molybedenum and titanium. The possible use of metal stampings and plastic in the present invention may reduce the depletion of important national resources. It should be understood that the cross section of the guide in any of the embodiments of the present invention need not be octagonal but will depend in large part upon the silhouette desired. One alternative embodiment is illustrated in FIG. 8.

In the preferred embodiment illustrated coarsely threaded stud 32 is threadably engaged with the coarsely threaded bore 10 in the guide. This coarsely threaded stud has two threaded regions 34 and 36. The threaded regions are located at either end of the stud 38 and 40 and are separated by a non-threaded region 42. An end of the stud 38 is threaded into the coarsely threaded bore 10 in the guide 4 while the other end 40 is threadably engaged with a coarse adjustor 44.

A finely threaded stud 46 is similarly situated in the opposite face of the guide 4. This finely threaded stud 46 also has two externally threaded regions 48 and 50, one at either end 52 and 54, respectively of the stud. These threaded regions are in turn separated by a non threaded region 56 similar to the arrangement of the coarsely threaded stud 32. The end of the stud 52 is threaded into the finely threaded bore 12. The opposite end 54 is threadably engaged with a fine adjustor 58

In the present embodiment the threaded portions of the studs 34 and 48 engaged with the guide 4 extend along a relatively short length of the stud as compared to the threads 36 and 50 on the opposite end 40 and 54, respectively. The length of the non threaded regions 42 and 56 are even shorter.

The coarse adjustor 44 generally resembles a disk 60 having a cylindrical extension 62. The cylindrical extension 62 is integral with a first face 64 of the disk 60 and extends along the center line of the disk. An axially aligned internally threaded bore 66 extends through the disk 60 and the cylindrical extension 62. The coarse adjustor 44 thereby threadably engages the exposed threaded region 36 of the coarsely threaded stud 32 as mentioned above. The first cylindrical extension 62 has a non threaded countersink 68 at end 70 opposite the end 72 integral with the disk 60. The free end 70 of the cylindrical extension 62 and countersink 68 is flared outwardly. The purpose of the flared end 70 is set forth in more detail below. The disk edge 72 may have a number of grooves 74 parallel to the axis of the threaded bore 66. The grooves 74 may be spaced forty-five degrees apart about the disk edge 72. If the grooves are present they may be used in conjunction with a locking system which is set forth in more detail below.

The finely threaded adjustor 58 includes a disk 76 and cylindrical extension 78 integral with one of its faces 80 threadably engages the finely threaded stud 46 at threaded region 50 at end 54 in a manner similar to that of the coarsely threaded adjustor 44. A finely threaded bore 82 extends through the fine adjustor 58 and the associated cylindrical extension 78 in the same fashion as the coarsely threaded bore 66 in the coarse adjustor 44. The second cylindrical extension 78 has a countersink 84 in its free end 86 and the free end is flared similar to that of the coarse adjustor. The fine adjustor 58 may have eight grooves 88 located in the disk edge 90 parallel to the finely threaded bore 58. The grooves 88 may be equally spaced about the edge of the fine adjustor. The grooves may be used in conjunction with a locking system as more fully set forth below.

A first thrust washer 92 is located adjacent to outer face 64 of the coarse adjustor 44. The thrust washer 92 is freely mounted on the first cylindrical extension 62 and in operation the thrust washer dissipate vibration transmitted from the stay, guide, cable, rigging and the like (not shown) to the tensioning device 2 of the present invention. A second thrust washer 96 is located adjacent face 80 of the fine adjustor 58 and is freely mounted about cylindrical extension 78. The second thrust washer 96 also acts to dissipate vibration transmitted to the tensioning device from the attached stay, guide, cable, rigging and the like. The purpose of thrust washers 92 and 96 is that of protecting the tensioning device 2 from wear and providing a rotation bearing surface for the associated adjustors.

A first cross over bar 100 which has a centrally located smooth bore 102 is movably engaged with cylindrical extension 62 by means of the smooth bore 102. The first cross over bar 100 has a generally rectangular shape and includes two rectangular tangs 104 and 106 each integral with an end 108 and 110, respectively of the bar 100. Each tang 104 and 106 has a circular bore 112 and 114, respectively therethrough which is perpendicular to the longitudinal axis of the tensioning device 2. A second cross over bar 116 also having two rectangular tangs 118 and 120 at either end 122 and 124 and a pair of circular bores 126 and 128, respectively is located about cylindrical extension 78 on the fine adjustor 58.

Thrust washers 130 and 132 are freely mounted about cylindrical extensions 62 and 78, respectively. These two thrust washers also act to dissipate vibrations transmitted from the stays, guides, cables, rigging and the like attached to the tensioning device 2 as well as providing rotational bearing surfaces for the associated adjustors.

Thrust washer 92, cross over bar 100 and thrust washer 130 are located between the coarse adjustor 44 and the flared end 70 of the cylindrical extension 62 integral with the coarse adjustor. Similarly, thrust washer 96, cross over bar 116 and thrust washer 132 are located about the cylindrical extension 78 integral with the fine adjustor 58 between the fine adjustor and the flare at the end 86 of the cylindrical extension 78.

A coarsely threaded nut 134 is threadably engaged with the outer most threaded region 36 of the coarsely threaded stud 32. A finely threaded nut 136 is threadably engaged with the outwardly threaded portion 50 of the finely threaded stud 46. The nuts 134 and 136 act as limits to outward movement of the coarse 44 and fine 58 adjustors and may be used for example to mark desired adjustor travel and/or a maximum tension adjustment.

In a preferred embodiment the adjustors 44 and 58 may have hexagonal protrusions 138 and 140 extending from inner faces 142 and 144, respectively. The internally threaded bores of the adjustors extend through the protrusions. The protrusions 138 and 140 are located in axial alignment with the threaded bore of each adjustor. Hexagonal protrusions 138, 140 provide means for quickly rotating the adjustors 44, 58 to a desired position with a standard size wrench. However, it should be understood that any satisfactorily shaped protrusion or indentation will suffice for providing quick and easy rotation of the adjustors.

The axial movement of the tensioning device 2 is guided by the sliding of four identical side rails 146, 148, 150 and 152 slidably engaged with the rectangular shoulders 14, 16, 18 and 20, respectively protruding from the outer surface of the guide 4. Each side rail 146, 148, 150 and 152 may have a rectangularly contoured peripheral edge 154, 156, 158 and 160, respectively and a generally rectangular cross section. Circular bores 162, 164, 166 and 168 may penetrate the regions of end 170, 172, 174 and 176 of each side rail 146, 148, 150 and 152, respectively. These bores extend perpendicularly to a plane parallel to the side rails. Rectangular bores 178, 180, 182 and 184 penetrate each side rail 146, 148, 150 and 152, respectively. The rectangular bores may be located in the region of the opposite ends 186, 188, 190 and 192 of the side rails from the circular bores.

Figure 2:
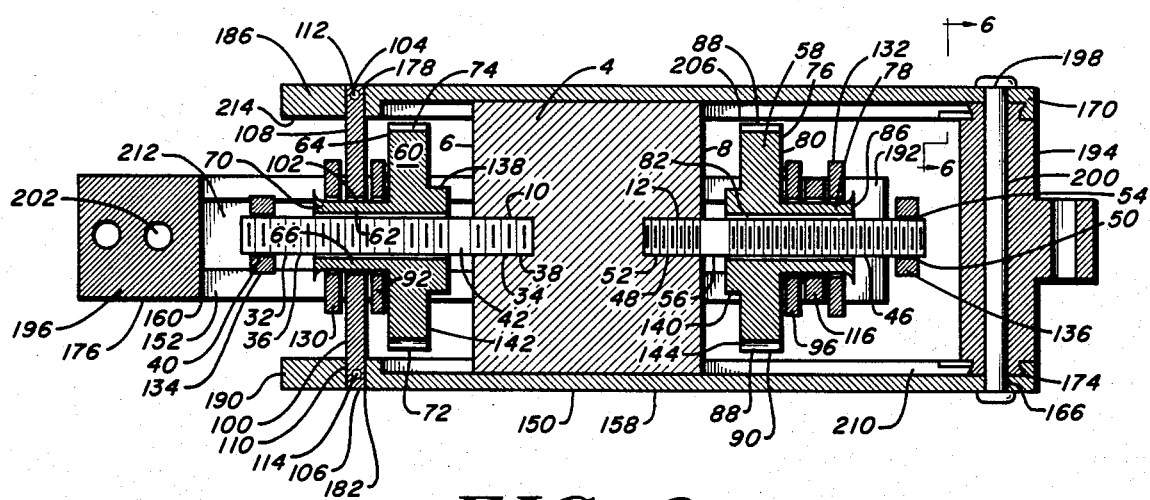
FIG. 2 is a cross sectional elevation taken along line 2—2 of FIG. 1.
Figure 3:
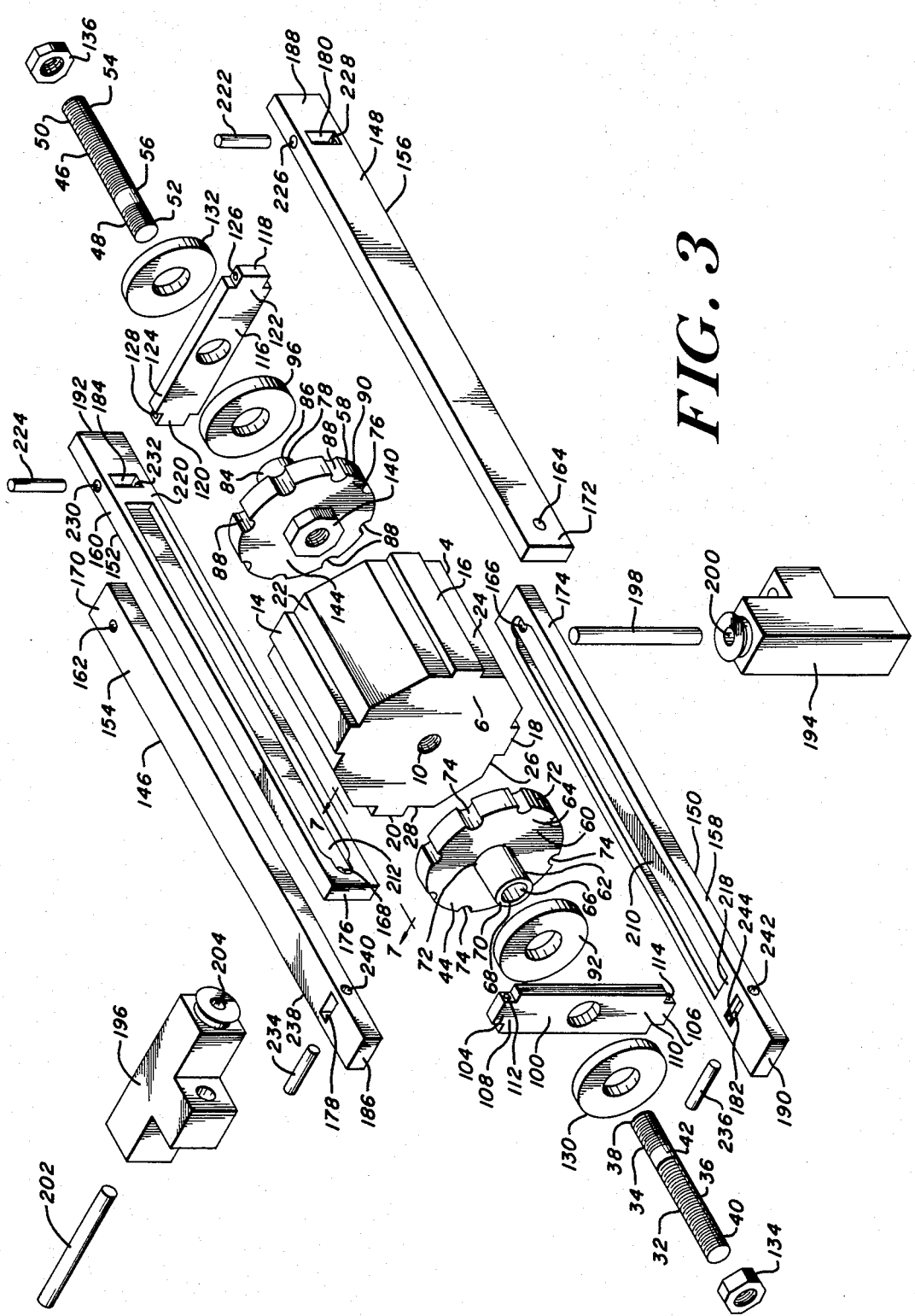
FIG. 3 is an exploded view of the tensioning device of FIG. 1.

As shown in FIGS. 1 through 3 cross over bar 100 is associated with side rails 146 and 150 and cross over bar 116 is associated with side rails 148 and 152. Tangs 104 and 106 engage the rectangular bores 178 and 182 of side rails 146 and 150, respectively. Tangs 118 and 120 engage the rectangular bores 180 and 184 of side rails 148 and 152, respectively. The opposite ends of the side rails from the cross over bars may be connected by end spacers 194 and 196. End spacer 194 connects side rails 146 and 150 while end spacer 196 connects side rails 148 and 152. Pin 198 may engage and attach side rails 146 and 150 and end spacer 194 through axially aligned bores 162, 200 and 166. The other pin 202 may engage and attach remaining side rails 148 and 152 and end spacer 196 through axially aligned boxes 164, 204, and 168.

Pins 222 and 224 through tangs 118 and 120 and bores 226, 228 and 230, 232 of side rails 148 and 152, respectively complete the connection of these side rails thereby forming a rigid assembly of the associated side rails, cross over bar and end spacer.

Figure 6:
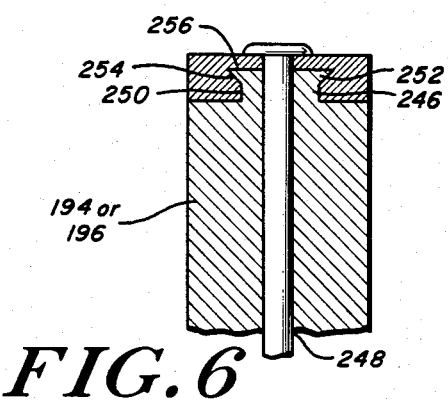
FIG. 6 is a sectional view taken along line 6—6 of FIG. 2.
Figure 7:
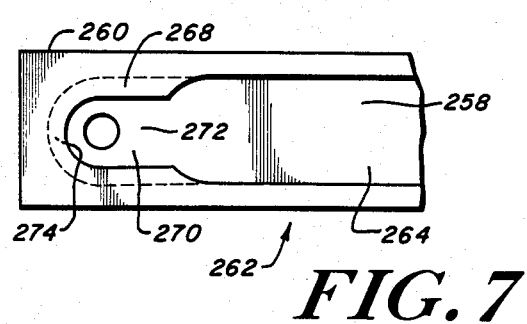
FIG. 7 is an elevational view taken along line 7—7 of FIG. 3.

Each side rail 146, 148, 150 and 152 has a longitudinal groove 206, 208, 210 and 212 on inner faces 214, 216, 218 and 220, respectively. The details of a preferred groove configuration are illustrated in FIGS. 6 and 7. It should be clearly understood that the grooves may have rectangular cross sections or other cross sections too numerous to list. Grooves 206, 208, 210 and 212 slidably engage shoulders 14, 16, 18 and 20, respectively on guide bar 4. The grooves act as tracks for their respective side rails such that side rails 146, 150 and 148, 152 and associated elements can move with respect to the guide bar upon rotation of adjustors 44 and 58, respectively.

As illustrated in FIGS. 1, 3 and 6 each end spacer 194, 196 may have a two (one shown for illustrative purposes) generally cylindrical protrusions 246 axially aligned with bores 248 which pass through the respective protrusions. In a preferred embodiment each cylindrical protrusion 246 may be narrower at base 250 than end 252, respectively. The wider portions at the ends may, as illustrated in FIG. 6 have a generally V-shaped cross section formed by the intersection of inclined face 254 with face 256. In a preferred embodiment the groove in each side rail has the configuration illustrated in FIGS. 6 and 7. A portion of the groove 258 intermediate the ends 260 (only one shown) of a side rail 262 may form a generally rectangular channel 264. At the end of each groove side rail inner face 268 extends out and over groove, track or channel at 270 forming slot 272 and undercut 274. The V-shaped portion of protrusion 246 matches the undercut. Thus, the v-shaped portion of the protrusion acts as a wedge so that tension at the ends of device 2 tends to pull the v of the protrusion in the under. This in turn acts to pull the attached siderails close together thereby tending to increase the strength the assemblies.

In another preferred embodiment guide bar 276 consists of four generally disk shaped elements 278, 280, 282 and 284 and a correspondingly contoured central element 286 held together with the central element. The central element or housing contains a yieldable compensator 288 to absorb excessive tension on the device over and above the devices maximum design tension. This embodiment of the guide bar is illustrated in FIGS. 4 and 5.

In this embodiment the guide consists of four separate disks. There are two outer disks 278, 284, two intermediate disks 280, 282 and a central element 286. The central disk may be thicker than either of the four disks. Each disk and central element may have four threaded holes 288 there through located in the region of the shoulders. Outer disks 278, 284 include centrally located smooth bores 290, 292 perpendicular to the plane of the disks. The intermediate disks 280, 282 include central bores 294, 296 that may have a hexagonal cross section central disk. When threaded holes 288 are in axially alignment the four disks and central element may be put together and secured together with threaded bolts and nuts 298 and 300, respectively. In the guide shown in FIGS. 4 and 5 a spring 302 is located in an enlarged central bore 30 through the central element. Circular disks 306, 308 may be located at either end of the spring. Each circular disk butts against adjacent bolt heads 310 and 312. Each bolt is confined to axial movement. In a preferred embodiment device 2 is designed with a yieldable compensator and intermediate disc thickness such that each bolt shall travel less than the thickness of the associated intermediate disc. It should be understood that the remaining elements of the tensioning devise may be described and assembled as described in the previous embodiments. An hydraulic cylinder (not shown) or other yieldable compensator may be used instead of spring.

In operation stays, rigging, guides or the like (not shown) may be attached to the ends of the tensioning device following which the adjustors are rotated until the stays or other attached members are placed in the desired tension. Generally the coarse adjustor is operated first to bring the attached members to the general value of desired tension. Then the fine adjustor is operated to fine tune the tensioning device so as to provide the desired tension on the attached member. As previously noted, the nuts at the ends of the studs or bolts used to limit axial adjustor travel including runoff of the associated adjustor.

In the event of failure of the coarse threads, the threads which will normally fail first, the tensioning device will try to separate. The separation is stopped when the cross over bar assembly comes in to contact with the guide. As can readily be seen from the drawings, upon failure of the coarse threads the tensioning device will only move a distance equal to the distance between coarse adjustor face (or hexagonal nut face depending upon the embodiment in use and first parallel face. After failure the device may be retensioned by adjusting the remaining fine adjustor. If for any reason the fine threads fail the tensioning device will still remain together unlike conventional turnbuckles thereby retaining enough tension on the attached stays or the like so as to hold whatever is being supported, such as a mast on a sailing vessel, in place until repairs and replacement parts can be obtained.

As an example, during actual operation of a sailing vessel there are periods when the force applied to the mast may translate into a tension on a stay and the tensioning device which is a greater force than the designed tensile strength of the stay. It is during this situation that the embodiment including a yieldable compensator may provide momentary slack by absorbing the excess tension. The yieldable compensator acts to maintain a constant tension on the tensioning device of the present invention up to the compensator's limits.

Figure 10:
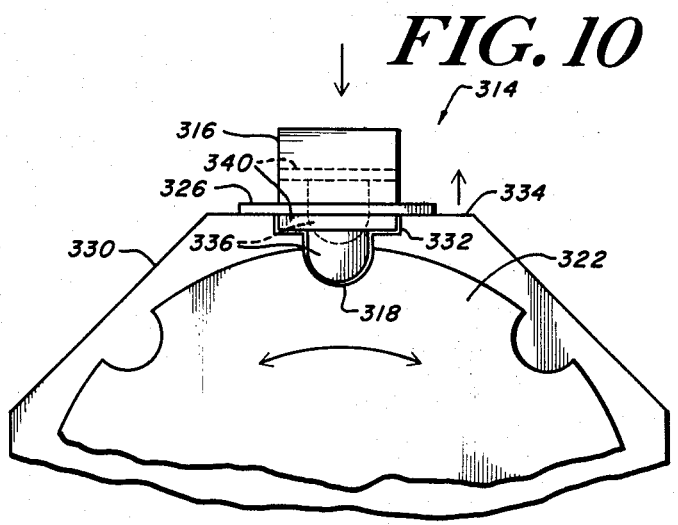
FIG. 10 is a partial elevation as viewed from the left end of FIG. 9.
Figure 9:
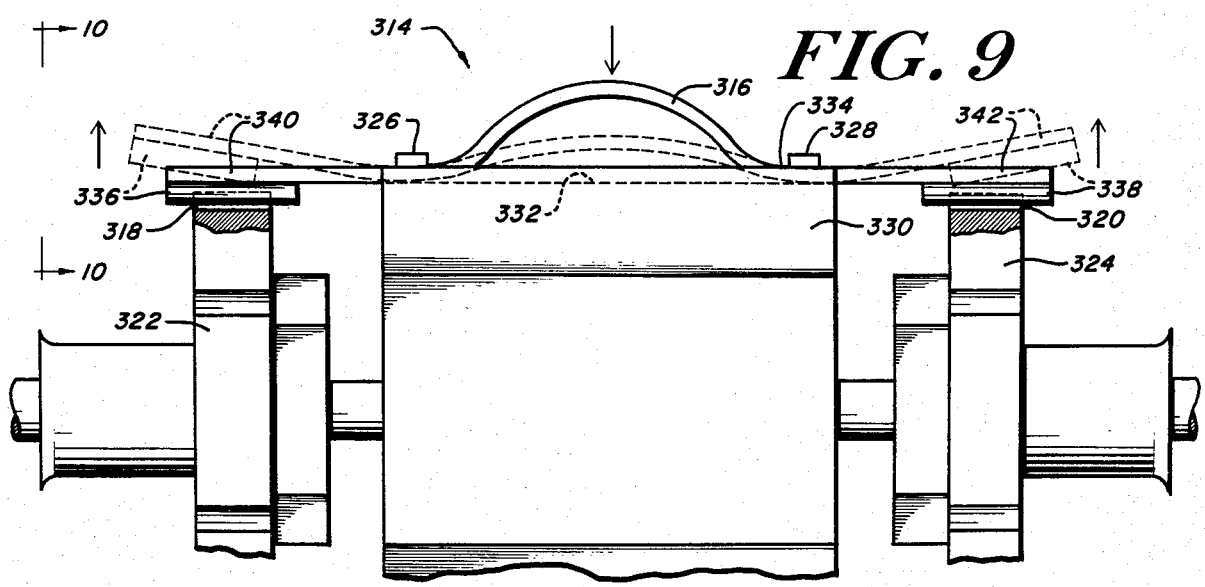
FIG. 9 is an elevation of the present invention illustrating a locking assembly.

The present invention may also include a locking means. One preferred embodiment of such means is shown in FIGS. 9, and 10. A locking device 314 includes a leaf spring 316 slidable engagable with grooves 318, 320 the coarse adjustor 322 and the fine adjustor 324, respectively while pivoting about a pair of stops 326, 328 attached to opposite ends of the guide bar 330. The spring 316 slides within a channel 332 on a non-shouldered peripheral face 334 of the guide bar 330. A pair of depending elements 336, 338 may be attached to either end 340, 342 of the leaf spring 316 for engaging the desired groove. The stops are attached to the guide bar by tack welding or other means well-known to those skilled in the art so that they bridge channel 332 thereby restraining leaf spring 316.

In operation, depending elements normally engage a pair of grooves 318, 320 thereby restraining both adjustors at a first desired position. When it is desired to move either or both adjustors the leaf spring is forced towards the guide bar in the direction of Arrow A thereby forcing ends 340, 342 out of engagement with the grooves in the direction of Arrows B and C and freeing the adjustors 322 and 324 for the desired movement. When the desired adjustment is made the leaf spring 316 is released and the ends thereof are automatically returned to engagement with the grooves (possibly different grooves) once again restraining the adjustors in a second desired position.

As can be seen by the foregoing description the device of the present invention incorporates a compression of the adjusting elements as opposed to the standard turnbuckle in which the design strength is established by tensile strength. As a result of this difference the comparative strength to size is greater for the present invention than it is for a standard turnbuckle.

It should be clear to those skilled in the art that the tensioning device described herein is not limited in its usefulness to sailing vessels. In fact, it is believed that the tensioning device of the present invention may be used in place of any turnbuckle. The size of an adjustable tensioning device of the present invention as well as the materials from which it is made depends upon the application and will be practically unlimited in view of the many applications presently utilizing turnbuckles. The size and material of manufacture should be easily ascertainable by those skilled in the art for each usage of the device. It should also be clear to those skilled in the art that the side rails and associated cross over bar need not be separate pieces but may be, for instance, a single piece or two pieces as long as the central element (e.g., the guide) is intermediate the adjusting element and the attached stay, guy, cable, rigging and the like. Since these and other changes may be made in the foregoing disclosure without departing from the scope of the invention herein involved, it is intended that all matter shown in the accompanying drawings or described in the foregoing specification be interpreted in an illustrative and not a limiting sense.

What is claimed is:

1. A device for drawing together two members, the device comprising:

anti-separation means;

a first member attached to the anti-separation means;

a second member attached to the anti-separation means;

the anti-separation means intermediate the first and second member;

first moveable means adjustably engaged with the first member;

second moveable means adjustably engaged with the second member;

a third member associated with the first moveable means whereby movement of the first moveable means on the first member causes corresponding movement of the third member;

a fourth member associated with the second moveable means whereby movement of the second moveable means on the second member causes corresponding movement of the fourth member;

a first attachment means for connecting a first member to be tensioned to the third member with the anti-separation means intermediate the first attachment means and the first moveable means;

a second attachment means for connecting a second member to be tensioned to the fourth member with the anti-separation means intermediate the second attachment means and the second moveable means, whereby movement of the first moveable means results in corresponding movement of the first attachment means and first attached member to be tensioned and movement of the second moveable means results in corresponding movement of the second attachment means and second attached member to be tensioned thereby varying tension on the attachements to the first and second attachment means and the anti-separation means intermediate the first moveable means and first attachment means as well as the second moveable means and the second attachment means precluding separation of the device if either the first or second moveable means fails.

2. A device for drawing together two members the device comprising:

anti-separation means, the anti-separation means including a plurality of guide means;

a first threaded member attached to the anti-separation means;

as second threaded member attached to the anti-separation means, the first and second threaded members separated by the anti-separation means;

first adjusting means threadable and rotatably engaged with the first threaded member for translation thereon the first adjusting means having first restricting means;

second adjusting means threadably and rotatably engaged with the second threaded member for translation thereon, the second adjusting means having second restricting means;

a first member slidably engaged with the first threaded member and located between the first adjusting means and first restricting means whereby translation of the first adjusting means on the first threaded member causes corresponding translation of the first member;

a second member slidably engaged with the second threaded member and located between the second adjusting means and second restricting means, whereby translation of the second adjusting means on the second threaded member causes corresponding translation of the second member;

a plurality of guided members movably engaged with the guide means, a first number of guided members attached to the first member, a second number of guided members attached to the second member;

a first end member having first means for attaching a first member to be tensioned attached to the first number of guided members, the anti-separation means intermediate the first end member and the first adjusting means;

a second end member having second means for attaching a second member to be tensioned attached to the second number of guided members, the anti-separation means intermediate the second end member and the second adjusting means, whereby translation of the first adjusting means results in corresponding translation of the first end member and attached member to be tensioned and translation of the second adjusting means results in corresponding translation of the second end member and attached member to be tensioned thereby varying tension on the attachments to the first and second end members and failure of the threads on either the first or second threaded members does not result in separation of the device since the anti-separation means lies between the first member and first end member as well as the second member and second end member.

3. The device of claim 2, further comprising:

first vibration isolation means associated with the first threaded member, first adjusting means and first member; and second vibration isolation means associated with the second threaded member, second adjusting means and second threaded member.

4. The device of claim 3, wherein the vibration isolation means comprise:

a first thrust washer movably engaged with the first threaded member, the first thrust washer located between the first adjusting means and the first member;

a second thrust washer movable engaged with the first threaded member, the second thrust washer located between the first member and first restricting means;

a third thrust washer movably engaged with the second threaded member, the third thrust washer located between the second adjusting means and the second member; and a fourth thrust washer movably engaged with the second threaded member, the fourth thrust washer located between the second member and second restricting means, whereby the threads of the first and second threaded members are protected from deterioration due to vibrations in adjacent elements of the device and providing rotational bearing surface for first and second adjusting means.

5. The device of claim 2, wherein:

the first threaded member is finely threaded; and the second threaded member is coarsely threaded.

6. The device of claim 2, further comprising:
locking means associated with the first and second adjusting means for releasably locking the first and second adjusting means in any one of an infinite number of locations on the first and second threaded members, respectively.

7. A device for drawing together two members, the device comprising:
anti-separation means;
a first member moveably engaged with the anti-separation means;
a second member moveably engaged with the anti-separation means;
the anti-separation means intermediate the first and second member;
first moveable means adjustably engaged with the first member;
second moveable means adjustably engaged with the second member;
a third member associated with the first moveable means whereby movement of the first moveable means on the first member causes corresponding movement of the third member;
a fourth member associated with the second moveable means whereby movement of the second moveable means on the second member causes corresponding movement on the fourth member;
a first attachment means for connecting a first member to be tensioned to the third member with the anti-separation means intermediate the first attachment means and the first moveable means;
a second attachment means for connecting a second member to be tensioned to the forth member with the anti-separation means intermediate the second attachment means and the second moveable means, whereby movement of the first moveable means results in corresponding movement of the first attachment means and first attached member to be tensioned and movement of the second moveable means results in corresponding movement of the second attachment means and second attached member to be tensioned thereby varying tension on the attachments to the first and second attachment means and the anti-separation means intermediate the first moveable means and first attachment means as well as the second moveable means and the second attachment means and the anti-separation means intermediate the first moveable means and first attachment means as well as the second moveable means and the second attachment means precluding separation of the device if either the first or second moveable means fails; and
yieldable compensating means, the yieldable means in contact with the first member at a first end and in contact with the second member at the second end, yieldable means intermediate the first and second members, whereby the yieldable means yields to the tension forces acting upon the device thereby protecting the device in a plurality of otherwise failure including overtensioned conditions.

8. A device for drawing together two members, the device comprising:
anti-separation means, the anti-separation means including a plurality of guide means;
a first threaded member moveably engaged with the anti-separation means;
a second threaded member moveably engaged with the anti-separation means, the first and second threaded members separated by the anti-separation means;
first adjusting means threadable and rotatably engaged with the first threaded member for translation thereon first adjusting means having first restricting means;
second adjusting means threadably and rotatably engaged with the second threaded member for translation thereon second adjusting means having second restricting means;
a first member slidably engaged with the first threaded member and located between the first adjusting means and first restricting means whereby translation of the first adjusting means on the first threaded member causes corresponding translation of the first member;
a second member slidably engaged with the second threaded member and located between the second adjusting means and second restricting means, whereby translation of the second adjusting means on the second threaded member causes corresponding translation of the second member;
a plurality of guided members movably engaged with the guide means, a first number of guided members attached to the first member, a second number of guided members attached to the second member;
a first end member having first means for attaching a first member to be tensioned to the first number of guided members, the anti-separation means intermediate the first end member and the first adjusting means;
a second end member having second means for attaching a second member to be tensioned to the second number of guided members, the anti-separation means intermediate the second end member and the second adjusting means, whereby translation of the first adjusting means results in corresponding translation of the first end member and attached member to be tensioned and translation of the second adjusting means results in corresponding translation of the second end member and attached member to be tensioned thereby varying tension on the attachments to the first and second end members and failure of the threads on either the first or second threaded members does not result in separation of the device as the anti-separation means lies between the first member and first end member as well as the second member and second end member; and
yieldable compensating means, the yieldable means in contact with the first threaded member at a first end and in contact with the second threaded member at a second end, yieldable means intermediate the first and second threaded members, whereby the yieldable means yields to the tension forces acting on the device thereby protecting the device in a plurality of otherwise failure inducing over tensioned conditions.

9. The device of claim 8, further comprising:
first vibration isolation means associated with the first threaded member, first adjusting means and first member; and
second vibration isolation means associated with the second threaded member, second adjusting means and second threaded member.

10. The device of claim 9, wherein the vibration isolation means comprise:
  a first thrust washer movably engaged with the first threaded member, the first thrust washer located between the first adjusting means and the first member;
  a second thrust washer movable engaged with the first threaded member, the second thrust washer located between the first member and first restricting means;
  a third thrust washer movably engaged with the second threaded member, the third thrust washer located between the second adjusting means and the second member; and
  a fourth thrust washer movably engaged with the second threaded member, the fourth thrust washer located between the second member and second restricting means, whereby the threads of the first and second threaded members are protected from deterioration due to vibrations in adjacent elements of the device and providing rotational bearing surface for first and second adjusting means.

11. The device of claim 8, wherein:
  the first threaded member is finely threaded; and
  the second threaded member is coarsely threaded.

12. The device of claim 8, further comprising:
  locking means associated with the first and second adjusting means for releasably locking the first and second adjusting means in any one of an infinite number of locations on the first and second threaded members, respectively.

13. A tensioning device for adjusting the distance between adjacent ends of cables or the like comprising:
  a pair of elongated rigid elements extending in parallel directions and in adjacent relation to one another;
  means for securing a cable to one end of one of the said rigid elements and a second means for securing a second cable to the end of said other rigid element opposite of said one end of said first rigid element;
  means associated with said rigid elements for movement of said rigid elements in different directions in response to forces applied to said cables;
  means for limiting the movement of said rigid elements over a path of defined length unless the forces applied to said cables exceed a predetermined limit; and
  additional means for limiting the movement of said rigid elements to be less than or equal to the length of a second path of defined length including but greater than said first mentioned path when said forces exceed said predetermined limit.

14. The tensioning device of claim 13 further comprising:
  means for yieldably limiting the movement of said rigid elements over a third path of defined length unless the forces applied to said cable exceed a second predetermined limit, said third path including but greater than said first path and said second predetermined limit greater than said first predetermined limit;
  said additional means limiting the movement of said rigid elements over said second path of defined length including but greater than said third path when said forces exceed said second predetermined limit.

15. The tensioning device of claim 13 further comprising:
  means for releaseably restraining said movement means associated with said rigid elements, when said rigid elements obtain any desired adjacent relation.

16. A tensioning device for drawing together two members, said device comprising
  a first closed rectangular frame having a first and second end,
  a second closed rectangular frame, said second frame having a first and second end,
  means for attaching one of said members to said first end of said first frame,
  means for attaching the other of said members to said first end of said second frame, and
  means attached to said second end of said first frame and to said second end of said second frame for forcing said second end of said first frame away from the second end of said second frame
  said second end of said first frame being looped through said second end of said second frame so that said first and said second frames cannot physically separate upon a mechanical failure of said forcing means.

17. A tensioning device according to claim 16 wherein said forcing means comprises a bar located between the interlinked ends of said first and said second frames and screw adjustment means attached to said bar and to one of said first and second frames.

18. A tensioning device according to claim 17 wherein said screw adjustment means attaches said second end of said first frame to one end of said bar and said second end of said second frame to the other end of said bar.

19. A tensioning device according to claim 18 wherein said bar is rigid.

20. A tensioning device according to claim 18 wherein said bar comprises a rigid shell, a first end piece moveable in said shell and attached to the second end of said first frame, a second end piece movable in said shell and attached to the second end of said second frame, and resilient means separating said first and said second endpieces.

* * * * *